US012756430B2

(12) United States Patent
Vook et al.

(10) Patent No.: US 12,756,430 B2
(45) Date of Patent: Oct. 6, 2026

(54) JOINT SRI AND CONFIGURATION INFORMATION FOR UE

(71) Applicant: Nokia Technologies Oy, Espoo (FI)

(72) Inventors: Frederick Vook, Naperville, IL (US); Sami-Jukka Hakola, Oulu (FI); Matha Deghel, Massy (FR); Juha Pekka Karjalainen, Oulu (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/839,376

(22) PCT Filed: Mar. 29, 2022

(86) PCT No.: PCT/US2022/022390
§ 371 (c)(1),
(2) Date: Aug. 16, 2024

(87) PCT Pub. No.: WO2023/191775
PCT Pub. Date: Oct. 5, 2023

(65) Prior Publication Data

US 2025/0158666 A1 May 15, 2025

(51) Int. Cl.
*H04B 7/0404* (2017.01)
*H04B 7/024* (2017.01)
(Continued)

(52) U.S. Cl.
CPC ........... *H04B 7/0404* (2013.01); *H04B 7/024* (2013.01); *H04B 7/0695* (2013.01);
(Continued)

(58) Field of Classification Search
CPC .... H04W 24/02; H04W 76/20; H04L 5/0051; H04L 5/0048; H04L 5/0005;
(Continued)

(56) References Cited

U.S. PATENT DOCUMENTS

| | | | |
|---|---|---|---|
| 2018/0049236 A1 | 2/2018 | Sun et al. | |
| 2019/0174466 A1 | 6/2019 | Zhang et al. | |

(Continued)

FOREIGN PATENT DOCUMENTS

| | | | |
|---|---|---|---|
| WO | 2021187823 A1 | 9/2021 | |
| WO | WO-2022087931 A1 * | 5/2022 | ............. H04L 5/001 |

OTHER PUBLICATIONS

English translation of WO-2022087931-A1, Retrieved from PE2E Search on Jan. 22, 2026 (Year: 2022).*

(Continued)

*Primary Examiner* — Omar J Ghowrwal

(74) *Attorney, Agent, or Firm* — Robert P. Michal, Esq.; Rimon PC

(57) ABSTRACT

In a system, apparatus, method, and non-transitory computer readable medium for enabling multi-transmission and reception point (TRP) uplink (UL) transmission from a multi-panel user equipment (UE), a UE device may be caused to, determine simultaneous uplink (UL) transmission configuration information, the simultaneous UL transmission information including at least a first sounding reference signal (SRS) resource set and a second SRS resource set, transmit SRS according to the simultaneous UL transmission configuration information to at least a serving RAN node, receive at least one joint SRS resource indicator (SRI) from the serving RAN node, and perform at least one UL transmission based on the joint SRI and the simultaneous UL transmission configuration information.

20 Claims, 7 Drawing Sheets

(51) Int. Cl.
*H04B 7/06* (2006.01)
*H04L 5/00* (2006.01)

(52) U.S. Cl.
CPC .......... *H04L 5/0005* (2013.01); *H04L 5/0007* (2013.01); *H04L 5/0023* (2013.01); *H04L 5/0048* (2013.01); *H04L 5/0053* (2013.01); *H04L 5/0094* (2013.01)

(58) Field of Classification Search
CPC ... H04L 5/0007; H04L 5/0023; H04L 5/0053; H04L 5/0094; H04B 7/0404; H04B 7/0695; H04B 7/024
See application file for complete search history.

(56) References Cited

U.S. PATENT DOCUMENTS

| | | | |
|---|---|---|---|
| 2020/0099466 A1 | 3/2020 | Nammi | |
| 2020/0304265 A1 | 9/2020 | Kim et al. | |
| 2022/0014328 A1 | 1/2022 | Sakhnini et al. | |
| 2023/0118905 A1 | 4/2023 | Go et al. | |
| 2024/0389096 A1* | 11/2024 | Chen | H04L 5/0055 |

OTHER PUBLICATIONS

"3rd Generation Partnership Project, Technical Specification Group Radio Access Network; NR; Physical layer procedures for data (Release 16)", 3GPP TS 38.214, V16.7.0, Sep. 2021, pp. 1-172.
Enescu, "5G New Radio: A Beam-based Air Interface", John Wiley & Sons Ltd, 2020, 35 pages.
"Moderator's summary for discussion [RAN93e-R18Prep-02] UL enhancements", 3GPP TSG RAN#93e, RP-211652, Agenda: 9.0.1, NTT Docomo Inc, Sep. 13-17, 2021, pp. 1-89.
International Search Report and Written Opinion received for corresponding Patent Cooperation Treaty Application No. PCT/US2022/022390, dated Jun. 22, 2022, 8 pages.
European Search Report for European Application No. 22935960.9 issued on Apr. 24, 2025.
European Office Action for European Application No. 22935960.9 issued on May 8, 2025.
Office Action for U.S. Appl. No. 18/927,274 issued on Mar. 21, 2025.
U.S. Office Action dated Jul. 3, 2025 for corresponding U.S. Appl. No. 18/927,274.
Examination report under sections 12 & 13 of the Patents Act, 1970 and the Patents Rules, 2003, issued by the Intellectual Property India, Government of India in relation to Indian Application No. 202447077049 dated Jul. 13, 2026 (8 pages).

* cited by examiner

JOINT SRI AND CONFIGURATION INFORMATION FOR UE

RELATED APPLICATION

This application claims priority to PCT Patent Application No. PCT/US2022/022390, filed 29 Mar. 2022, which is incorporated herein by reference in its entirety.

BACKGROUND

Field

Various example embodiments relate to methods, apparatuses, systems, and/or non-transitory computer readable media for multi-transmission and reception point (TRP) uplink (UL) transmission by multi-panel user equipment (UE) devices.

Description of the Related Art

A 5$^{th}$ generation mobile network (5G) standard, referred to as 5G New Radio (NR), is being developed to provide higher capacity, higher reliability, and lower latency communications than the 4G long term evolution (LTE) standard.

The 5G NR standard provides user equipment (UE) devices (hereinafter referred to as UE devices or UEs) with the ability to perform non-coherent joint transmission (NCJT) downlink (DL), e.g., simultaneous DL, from multiple transmission and reception points (TRPs) (e.g., multi-TRP) on different antenna panels of the UE devices. However, the 5G NR standard does not provide UEs with the ability to perform simultaneous uplink (UL) to multi-TRP, e.g., NCJT UL.

SUMMARY

At least one example embodiment relates to a user equipment (UE) device.

In at least one example embodiment, the UE device may include a memory storing computer readable instructions, and processing circuitry configured to execute the computer readable instructions to cause the device to, determine simultaneous uplink (UL) transmission configuration information, the simultaneous UL transmission information including at least a first sounding reference signal (SRS) resource set and a second SRS resource set, transmit SRS according to the simultaneous UL transmission configuration information to at least a serving RAN node, receive at least one joint SRS resource indicator (SRI) from the serving RAN node, and perform at least one UL transmission based on the joint SRI and the simultaneous UL transmission configuration information.

Some example embodiments provide that the at least one joint SRI corresponds to an entry in the first SRS resource set and the second SRS resource set, and the device is further caused to, determine UL resources in each of the first and second SRS resource sets corresponding to the joint SRI, and perform the at least one UL transmission to at least one of the serving RAN node and a second RAN node based on the determined UL resources.

Some example embodiments provide that the first SRS resource set and the second SRS resource set have a same number of UL resources, and the first SRS resource set and the second SRS resource set each includes at least one single-UL resource and at least one multi-UL resource.

Some example embodiments provide that the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state, and the second SRS resource set includes at least one second NULL resource corresponding to the at least one first single-UL transmission resource, at least one second single-UL transmission resource corresponding to at least one second UL TCI state, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

Some example embodiments provide that the device is further caused to, determine a UL transmission mode based on the at least one joint SRI, the first SRS resource set, and the second SRS resource set, and perform the at least one UL transmission based on the determined UL transmission mode.

Some example embodiments provide that the UL transmission mode is one of a single-shot UL transmission mode, a time-domain multiplexed (TDM) UL repetition mode, a spatial-domain multiplexed (SDM) multi-UL transmission mode, and a frequency-domain multiplexed (FDM) multi-UL transmission mode.

Some example embodiments provide that the device is further caused to, perform the at least one UL transmission to one of the serving RAN node or a second RAN node in response to the determined UL transmission mode being the single-shot UL transmission mode, perform the at least one UL transmission to the serving RAN node and the second RAN node in consecutive TDM slots or subslots in response to the determined UL transmission mode being the TDM UL repetition mode, and perform the at least one UL transmission to the serving RAN node and the second RAN node simultaneously in response to the determined UL transmission mode being the SDM multi-UL transmission mode or the FDM multi-UL transmission mode.

Some example embodiments provide that the device is further caused to, receive at least two joint SRI from the serving RAN node, and determine the UL transmission mode based on the at least two joint SRI, the first SRS resource set, and the second SRS resource set.

Some example embodiments provide that the device is further caused to determine the simultaneous UL transmission configuration information based on simultaneous DL transmission configuration information.

Some example embodiments provide that the device is further caused to determine the simultaneous UL transmission configuration information by receiving the simultaneous DL transmission configuration information from the serving RAN node.

At least one example embodiment relates to a radio access network (RAN) node.

In at least one example embodiment, the RAN node may include a memory storing computer readable instructions, and processing circuitry configured to execute the computer readable instructions to cause the node to, provide simultaneous uplink (UL) transmission configuration information to a user equipment (UE) device, the simultaneous UL transmission information including at least a first sounding reference signal (SRS) resource set and a second SRS resource set, receive SRS from the UE according to the simultaneous UL transmission configuration information, select at least one joint SRS indicator (SRI) from the simultaneous UL transmission configuration information based on the received SRS, and transmit the selected at least one SRI to the UE device.

Some example embodiments provide that the at least one joint SRI corresponds to an entry in the first SRS resource set and the second SRS resource set, and the transmitted at least one SRI causes the UE device to determine UL resources in each of the first and second SRS resource sets corresponding to the joint SRI.

Some example embodiments provide that the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state, and the second SRS resource set includes at least one second NULL resource corresponding to the at least one first single-UL transmission resource, at least one second single-UL transmission resource corresponding to at least one second UL TCI state, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

Some example embodiments provide that the node is further caused to, select a UL transmission mode for the UE device, transmit a first joint SRI to the UE device, the first joint SRI corresponding to the selected UL transmission mode, and receive UL transmission from the UE device based on the selected UL transmission mode.

Some example embodiments provide that the UL transmission mode is one of a single-shot UL transmission mode, a time-domain multiplexed (TDM) UL repetition mode, a spatial-domain multiplexed (SDM) multi-UL transmission mode, and a frequency-domain multiplexed (FDM) multi-UL transmission mode.

Some example embodiments provide that the node is further caused to, transmit a second joint SRI to the UE device, the second joint SRI being the same as the first joint SRI in response to the selected UL transmission mode being the single-shot UL transmission mode, the first joint SRI and the second joint SRI corresponding to a NULL entry in either the first SRS resource set or the second SRS resource set, the second joint SRI being different than the first joint SRI in response to the selected UL transmission mode being the TDM UL repetition mode, and the second joint SRI being the same as the first joint SRI in response to the selected UL transmission mode being the SDM multi-UL transmission mode or the FDM multi-UL transmission mode, the first joint SRI and the second joint SRI corresponding to valid entries in both the first SRS resource set and the second SRS resource set.

At least one example embodiment relates to a method of operating a user equipment (UE) device.

In at least one example embodiment, the method may include determining simultaneous uplink (UL) transmission configuration information, the simultaneous UL transmission information including at least a first sounding reference signal (SRS) resource set and a second SRS resource set, transmitting SRS according to the simultaneous UL transmission configuration information, receiving at least one joint SRS indicator (SRI) from a serving RAN node, and performing at least one UL transmission based on the joint SRI and the simultaneous UL transmission configuration information.

Some example embodiments provide that the at least one joint SRI corresponds to an entry in the first SRS resource set and the second SRS resource set, and the method further comprises, determining UL resources in each of the first and second SRS resource sets corresponding to the joint SRI, and performing the at least one UL transmission to at least one of the serving RAN node and a second RAN node based on the determined UL resources.

Some example embodiments provide that the first SRS resource set includes at least one first single-UL transmission resource corresponding to at least one first UL transmission configuration indicator (TCI) state to the serving RAN node, at least one first NULL resource, and at least one first multi-UL transmission resource corresponding to the at least one first UL TCI state, and the second SRS resource set includes at least one second NULL resource corresponding to the at least one first single-UL transmission resource, at least one second single-UL transmission resource corresponding to at least one second UL TCI state to the second RAN node, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

Some example embodiments provide that the method may further include determining a UL transmission mode based on the at least one joint SRI, the first SRS resource set, and the second SRS resource set, and performing the at least one UL transmission based on the determined UL transmission mode.

At least one example embodiment relates to a user equipment (UE) device.

In at least one example embodiment, the UE device may include means for, determining simultaneous uplink (UL) transmission configuration information, the simultaneous UL transmission information including at least a first sounding reference signal (SRS) resource set and a second SRS resource set, transmitting SRS according to the simultaneous UL transmission configuration information to at least a serving RAN node, receiving at least one joint SRS resource indicator (SRI) from the serving RAN node, and performing at least one UL transmission based on the joint SRI and the simultaneous UL transmission configuration information.

Some example embodiments provide that the at least one joint SRI corresponds to an entry in the first SRS resource set and the second SRS resource set, and the device further includes means for, determining UL resources in each of the first and second SRS resource sets corresponding to the joint SRI, and performing the at least one UL transmission to at least one of the serving RAN node and a second RAN node based on the determined UL resources.

Some example embodiments provide that the first SRS resource set and the second SRS resource set have a same number of UL resources, and the first SRS resource set and the second SRS resource set each includes at least one single-UL resource and at least one multi-UL resource.

Some example embodiments provide that the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state, and the second SRS resource set includes at least one second NULL resource corresponding to the at least one first single-UL transmission resource, at least one second single-UL transmission resource corresponding to at least one second UL TCI state, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

Some example embodiments provide that the device further includes means for determining a UL transmission mode based on the at least one joint SRI, the first SRS resource set, and the second SRS resource set, and performing the at least one UL transmission based on the determined UL transmission mode.

Some example embodiments provide that the UL transmission mode is one of a single-shot UL transmission mode, a time-domain multiplexed (TDM) UL repetition mode, a spatial-domain multiplexed (SDM) multi-UL transmission mode, and a frequency-domain multiplexed (FDM) multi-UL transmission mode.

Some example embodiments provide that the device further includes means for performing the at least one UL transmission to one of the serving RAN node or a second RAN node in response to the determined UL transmission mode being the single-shot UL transmission mode, performing the at least one UL transmission to the serving RAN node and the second RAN node in consecutive TDM slots or subslots in response to the determined UL transmission mode being the TDM UL repetition mode, and performing the at least one UL transmission to the serving RAN node and the second RAN node simultaneously in response to the determined UL transmission mode being the SDM multi-UL transmission mode or the FDM multi-UL transmission mode.

Some example embodiments provide that the device further includes means for receiving at least two joint SRI from the serving RAN node, and determining the UL transmission mode based on the at least two joint SRI, the first SRS resource set, and the second SRS resource set.

Some example embodiments provide that the device further includes means for determining the simultaneous UL transmission configuration information based on simultaneous DL transmission configuration information.

Some example embodiments provide that the device further includes means for determining the simultaneous UL transmission configuration information by receiving the simultaneous DL transmission configuration information from the serving RAN node.

At least one example embodiment relates to a radio access network (RAN) node.

In at least one example embodiment, the RAN node may include means for, providing simultaneous uplink (UL) transmission configuration information to a user equipment (UE) device, the simultaneous UL transmission information including at least a first sounding reference signal (SRS) resource set and a second SRS resource set, receiving SRS from the UE according to the simultaneous UL transmission configuration information, selecting at least one joint SRS indicator (SRI) from the simultaneous UL transmission configuration information based on the received SRS, and transmitting the selected at least one SRI to the UE device.

Some example embodiments provide that the at least one joint SRI corresponds to an entry in the first SRS resource set and the second SRS resource set, and the transmitted at least one SRI causes the UE device to determine UL resources in each of the first and second SRS resource sets corresponding to the joint SRI.

Some example embodiments provide that the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state, and the second SRS resource set includes at least one second NULL resource corresponding to the at least one first single-UL transmission resource, at least one second single-UL transmission resource corresponding to at least one second UL TCI state, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

Some example embodiments provide that the node further includes means for, selecting a UL transmission mode for the UE device, transmitting a first joint SRI to the UE device, the first joint SRI corresponding to the selected UL transmission mode, and receiving UL transmission from the UE device based on the selected UL transmission mode.

Some example embodiments provide that the UL transmission mode is one of a single-shot UL transmission mode, a time-domain multiplexed (TDM) UL repetition mode, a spatial-domain multiplexed (SDM) multi-UL transmission mode, and a frequency-domain multiplexed (FDM) multi-UL transmission mode.

Some example embodiments provide that the node further includes means for, transmitting a second joint SRI to the UE device, the second joint SRI being the same as the first joint SRI in response to the selected UL transmission mode being the single-shot UL transmission mode, the first joint SRI and the second joint SRI corresponding to a NULL entry in either the first SRS resource set or the second SRS resource set, the second joint SRI being different than the first joint SRI in response to the selected UL transmission mode being the TDM UL repetition mode, and the second joint SRI being the same as the first joint SRI in response to the selected UL transmission mode being the SDM multi-UL transmission mode or the FDM multi-UL transmission mode, the first joint SRI and the second joint SRI corresponding to valid entries in both the first SRS resource set and the second SRS resource set.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
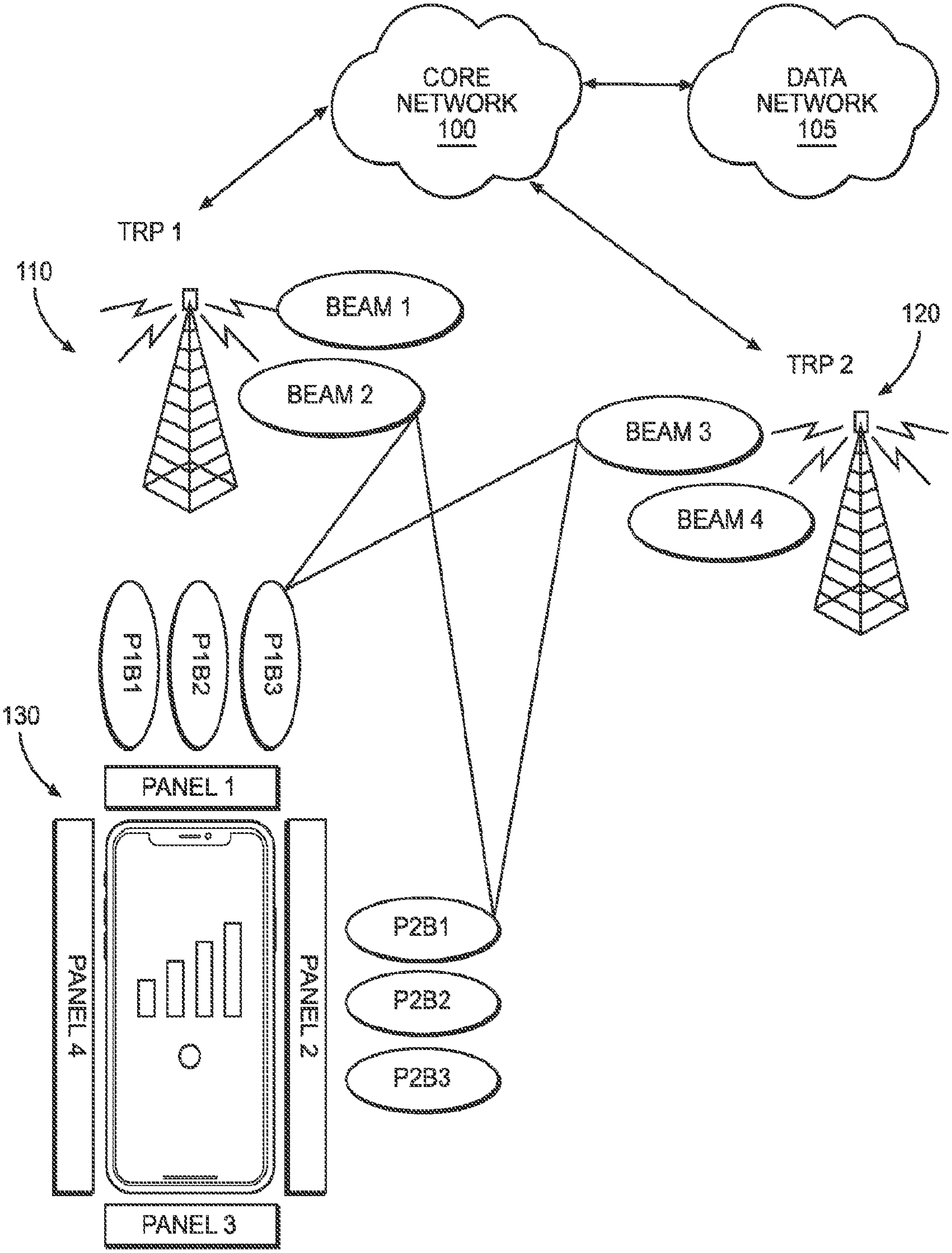
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a WIFI™ standard, a future 6G standard, a future 7G standard, etc.

Various example embodiments are directed towards extensions and/or enhancements to the 5G standard to provide support for and/or enable multi-panel UE devices to perform simultaneous uplink (UL) to a plurality of radio access network (RAN) nodes, e.g., multiple transmission and reception points (TRPs). The various example embodiments improve the UL bandwidth capacity and reliability of UEs by supporting their ability to perform simultaneous uploads using at least one beam from a plurality of panels of the UEs. Additionally, at least one example embodiment may provide increased and/or improved spatial UL multiplexing, as well as providing a mechanism which allows the UE to dynamically switch between different multi-TRP UL transmission modes, such as a spatial-domain multiplexing (SDM) UL transmission mode, a time-domain multiplexing (TDM) UL transmission mode, and/or a frequency-domain transmission mode (FDM) UL transmission mode, etc., to dynamically switch between multi-TRP UL transmission modes and single-TRP UL transmission modes, and/or to dynamically switch between single-TRP UL transmission modes, such as a single-TRP/single-panel UL transmission mode or a single-TRP/multi-panel simultaneous UL transmission mode (which may be an SDM or FDM mode), etc., to accommodate different UL transmission requirements and/or network requirements, such as different quality of service (QoS) requirements, latency requirements, reliability requirements, transmission power requirements, interference requirements, channel quality requirements, etc. Moreover, at least one example embodiment may provide the UE the capability to dynamically determine the multi-TRP UL transmission mode based on UL and/or DL measurements, etc.

FIG. 1 illustrates a wireless communication system according to at least one example embodiment. As shown in FIG. 1, a wireless communication system includes a core network 100, and a Data Network 105, a first radio access network (RAN) node 110, a second RAN node 120, a first user equipment device (e.g., UE device or UE, etc.) 130, etc., but the example embodiments are not limited thereto and the example embodiments may include a greater or lesser number of constituent elements. For example, the wireless communication system may include three or more RAN nodes, two or more UE devices, additional base stations, servers, routers, access points, gateways, etc.

The RAN node 110, the RAN node 120 and/or the UE device 130 may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WIFI™ network, etc.). The wireless network may include a core network 100 and/or a Data Network 105. The RAN node 110 and the RAN node 120 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN nodes 110, 120 may act as a relay node (e.g., an integrated access and backhaul (IAB) node) and may communicate with the UE device 130, etc., in combination with at least one base station (and/or access point (AP), router, etc.) (not shown) of the same or a different radio access technology (e.g., WIFI™, etc.).

The UE device 130 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 130 may be configurable to transmit and/or receive data in accordance to strict latency, reliability, and/or accuracy requirements, such as URLLC communications, TSC communications, etc., but the example embodiments are not limited thereto.

The wireless communication system further includes a plurality of TRPs (e.g., a base station, a wireless access point, etc.), such as RAN node 110, RAN node 120, etc. The RAN nodes 110, 120, etc., may operate according to an underlying cellular and/or wireless radio access technology (RAT), such as 5G NR, LTE, WIFI™, etc. For example, the RAN nodes 110, 120, etc., may be a 5G gNB node, a LTE eNB node, or a LTE ng-eNB node, etc., but the example embodiments are not limited thereto. The RAN nodes 110, 120, etc. may provide wireless network services to one or more UE devices within one or more cells (e.g., cell service areas, broadcast areas, serving areas, coverage areas, etc.) surrounding the respective physical location of the RAN node.

For example, the RAN nodes 110, 120, etc. may be configured to operate in a multi-user (MU) multiple input multiple out (MIMO) mode and/or a massive MIMO (mMIMO) mode, wherein the RAN nodes 110, 120, etc. transmit a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques. For example, as shown in FIG. 1, the RAN nodes 110 and 120 may each transmit and/or receive transmissions using two or more beams, but the example embodiments are not limited thereto, and for example, one or more of the RAN nodes may include a greater or lesser number of beams, etc.

Additionally, UE device 120 may be located within the cell service areas of both the RAN nodes 110 and 120, etc., and may connect to, receive broadcast messages from, receive paging messages from, receive/transmit signaling messages from/to, and/or access the wireless network through, etc., from one or both of the RAN nodes 110 and 120, but the example embodiments are not limited thereto.

According to at least one example embodiment, the UE device 130, etc., may include multiple antenna panels (e.g., may be a multi-panel UE device, etc.), and may transmit and/or receive to a plurality of RAN nodes (e.g., TRPs), such as RAN nodes 110 and 120, etc., using the same time-frequency resources and/or using resources overlapping in time, but the example embodiments are not limited thereto. For example, the UE device 130 may perform codebook based UL transmissions and/or non-codebook based UL transmission based on transmission configuration (e.g., TX configuration information and/or simultaneous TX configuration information, etc.) received from a serving RAN node, e.g., assumed to be RAN node 110 as an example, and/or the core network 100, etc., wherein the transmission configuration indicates which type of UL transmission to perform, but the example embodiments are not limited thereto.

With regards to codebook-based UL transmission, the UE 130 transmits several sounding reference signals (SRS) (e.g., SRS resource, etc.) to the serving RAN node 110 on the different UL beams of the UE 130. For example, if the UE 130 includes four antenna panels each capable of transmitting using four UL beams, the UE 130 transmits 16 SRS on the 16 total UL beams, etc., but the example embodiments are not limited thereto. The serving RAN node 110 receives the transmitted SRS, estimates the UL channels based on the received SRS, and determines which SRS to use for UL, based on the UL channel estimates, wherein each SRS specifies a particular antenna panel and TX beam combination for use to perform UL, etc. For example, the serving RAN node 110 may select the SRS, e.g., the UL resources for physical uplink control channel (PUCCH) information and/or physical uplink shared channel information (PUSCH) for each antenna panel of the UE based on metrics such as channel quality metrics (e.g., channel quality indicator (CQI), etc.), interference metrics (such as interference caused by the other antenna panels of the UE 130, etc.), TX power levels metrics, signal to noise ratio metrics, latency metrics, bandwidth metrics, reliability metrics, etc., but the example embodiments are not limited thereto. Additionally, the serving RAN node 110 may determine the rank indicator (RI) and/or the transmit precoding matrix index (TPMI), etc., based on the UL channel estimates as well. The serving RAN node 110 then transmits a SRS resource indicator (SRI) corresponding to the selected SRS resource, the RI, and/or the TPMI, etc., to the UE 130, but the example embodiments are not limited thereto. Based on the received SRI, RI, and/or TPMI, the UE 130 performs codebook-based UL transmission, or in other words PUSCH and/or PUCCH transmission using the selected SRS resource indicated by the SRI, etc.

With regards to non-codebook based UL transmission, the serving RAN node 110 may initially transmit a channel state information reference signal (CSI-RS) to the UE 130, and the UE 130 may estimate the precoder based on the CSI-RS. The UE 130 then transmits a plurality of SRS resources precoded (e.g., precoded SRS resources) using the estimated precoder to the serving RAN node 110 on the different UL beams, and the serving RAN node 110 may select which SRS resource(s) to use for UL transmission based on the received precoded SRS resources based on, e.g., channel quality metrics (e.g., CQI, etc.), TX power levels metrics, signal to noise ratio metrics, latency metrics, bandwidth metrics, reliability metrics, etc., but the example embodiments are not limited thereto. The serving RAN node 110 then transmits a SRI corresponding to the selected SRS resource(s) to the UE 130, and the UE 130 performs UL transmission, or in other words PUSCH and/or PUCCH transmission, using the selected SRS resource(s) indicated by the SRI, etc.

In at least one example embodiment, a beam, e.g., a UL beam and/or a DL beam, may also refer to spatial relation information, a UL TCI state, joint or common TCI state, a spatial filter, power control information (and/or power control parameters set), a SRS resource indicator pointing to one or more SRS resources, an antenna panel and/or antenna panel ID, quasi-colocation information (e.g., quasi-colocation information Type-D, and/or other type of colocation information), etc. More generally, all these terms may be interchangeably used.

According to some example embodiments, a UE panel, e.g., an antenna panel of the UE 130, etc., may be identified by an index of a corresponding UE capability value set and/or by a panel ID, etc., but is not limited thereto. Alternatively, or additionally, a panel may be identified and/or associated by at least one DL RS (or more generally RS) and/or simply by an UL beam, etc. Additionally, according to some example embodiments, a TRP may be identified by at least one of the following: an SRS resource set, a beam failure detection reference signal (BFD-RS) set, a subset/set of UL beams, a CORESETPoolIndex (if configured), a physical cell ID (PCI), etc., but the example embodiments are not limited thereto.

According to at least one example embodiment, the serving RAN node 110 may also configure the UE 130 to perform simultaneous UL transmission to multiple TRPs and/or to single TRP, using one or more SRI to the UE 130. The methods for configuring the UE 130 to perform simultaneous UL transmission to multiple TRPs will be discussed in connection with FIGS. 4-5.

According to at least one example embodiment, the RAN nodes 110, 120, etc., may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
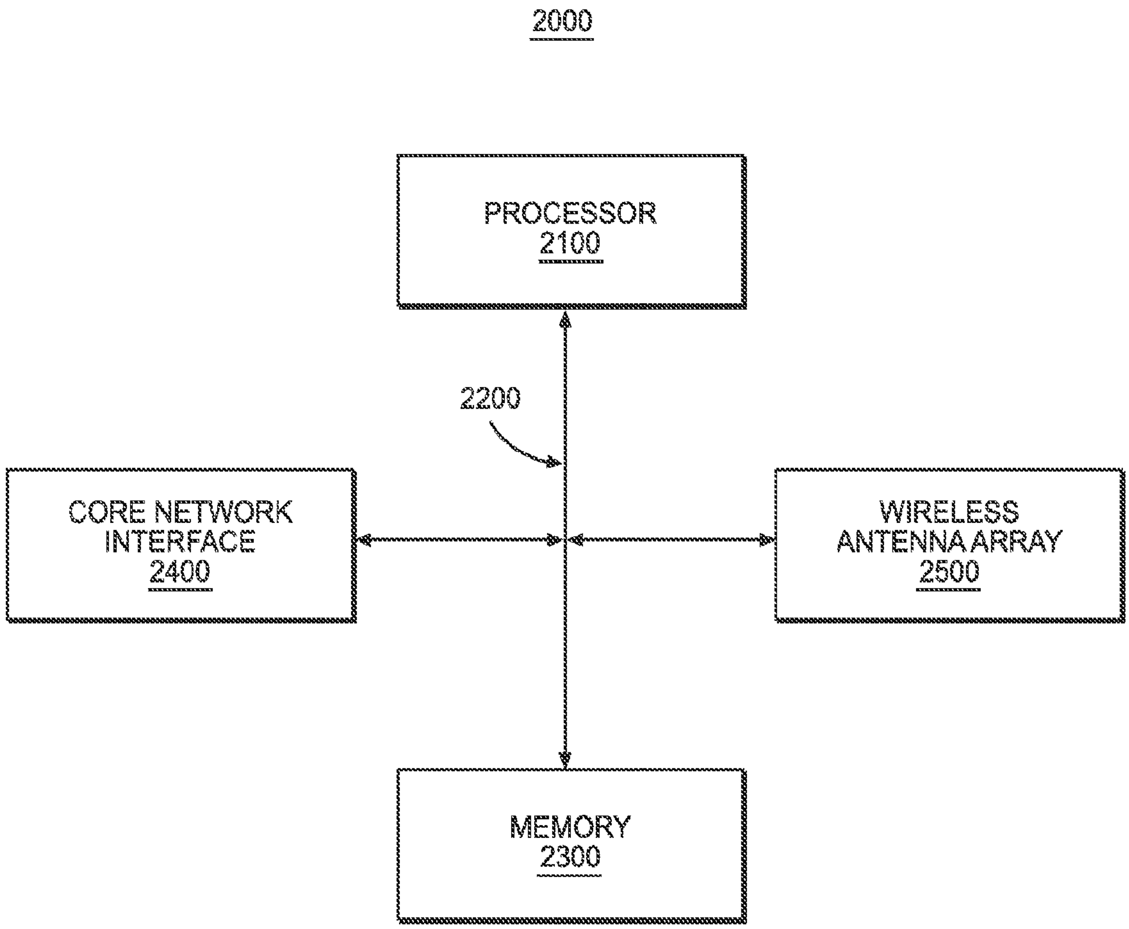
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN nodes 110 and 120 of FIG. 1, but the example embodiments are not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 5, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule time domain resource allocations (TDRAs), e.g., orthogonal frequency division multiplexing (OFDM) symbols, physical resource blocks (PRBs), resource elements, etc., for UE devices connected to the RAN node 2000, but the example embodiments are not limited thereto.

For example, the RAN node 2000 may allocate time-frequency resources of a carrier (e.g., resource blocks with time and frequency dimensions) based on operation on the time domain (e.g., time division duplexing) and/or the frequency domain (e.g., frequency division duplexing). In the time domain context, the RAN node 2000 will allocate a carrier (or subbands of the carrier) to one or more UEs (e.g., UE 120, etc.) connected to the RAN node 2000 during designated upload (e.g., uplink (UL)) time periods and designated download (e.g., downlink (DL)) time periods, or during designated special(S) time periods which may be used for UL and/or DL, but the example embodiments are not limited thereto.

When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will primarily be described as using the time domain, but the example embodiments are not limited thereto.

Additionally, the RAN node 2000 may transmit scheduling information via physical downlink common channel (PDCCH) information to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. Additionally, the RAN node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 130, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
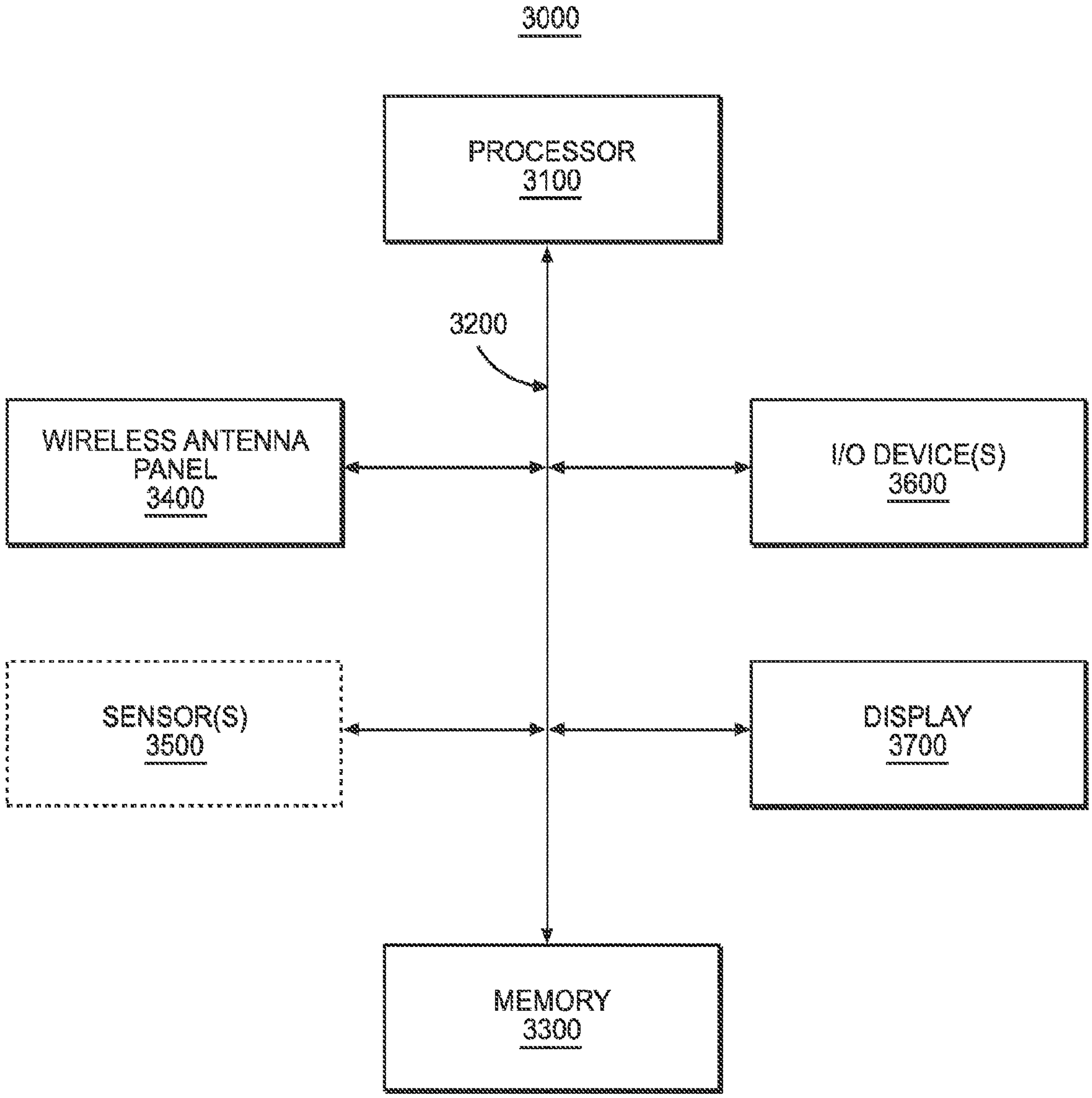
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to the UE device 130 of FIG. 1, but the example embodiments are not limited thereto, and the UE device(s) may employ alternative architectures, etc.

Referring to FIG. 3, a UE 3000 may include processing circuitry, such as at least one processor 3100, at least one communication bus 3200, a memory 3300, a plurality of wireless antennas and/or wireless antenna panels 3400, at least one input/output (I/O) device 3700 (e.g., a keyboard, a touchscreen, a mouse, a microphone, a camera, a speaker, etc.), and/or a display panel 3800 (e.g., a monitor, a touchscreen, etc.), but the example embodiments are not limited thereto. According to some example embodiments, the UE 3000 may include a greater or lesser number of constituent components, and for example, the UE 3000 may also include at least one battery (not shown), etc., but the example embodiments are not limited thereto. Additionally, the UE 3000 may further include one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), actuators, etc. Additionally, the display panel 3800, and/or I/O device 3700, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 to 5, etc. Such software elements may be loaded from a non-transitory computer-readable storage medium independent of the memory 3300, using a drive mechanism (not shown) connected to the UE 3000, or via the plurality of wireless antennas 3400, etc. Additionally, the memory 3300 may store network configuration information, such as system information, resource block scheduling, etc., for communicating with at least one RAN node, e.g., RAN nodes 110, 120, etc., accessing a wireless network, etc., but the example embodiments are not limited thereto.

In at least one example embodiment, the at least one communication bus 3200 may enable communication and data transmission/reception to be performed between elements of the UE 3000, and/or monitor the status of the elements of the UE 3000 (e.g., monitor the transmission power levels, monitor the interference levels, monitor channel quality levels, etc.). The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include a plurality of wireless antenna panels 3400, but is not limited thereto. The plurality of wireless antenna panels 3400 may include a plurality of associated radio units (not shown) and may be used to transmit wireless signals in accordance with at least one desired radio access technology, such as 4G LTE, 5G NR, WIFI™, etc. Additionally, the plurality of wireless antenna panels 3400 may be configured to transmit and/or receive data communications to one or more RAN nodes (and/or TRPs, e.g., RAN nodes 110, 120, etc.), but the example embodiments are not limited thereto. The plurality of wireless antenna panels 3400 may be located at the same or different physical locations on the body of the UE 3000, may have the same or different orientations, may operate in the same or different frequency ranges, may operate in accordance with the same or different radio access technology, etc. According to some example embodiments, the plurality of wireless antenna panels 3400 may be a single antenna, or may be a plurality of antennas, etc.

While FIG. 3 depicts an example embodiment of a UE 3000, the UE device is not limited thereto, and may include additional and/or alternative architectures that may be suitable for the purposes demonstrated.

Figure 4:
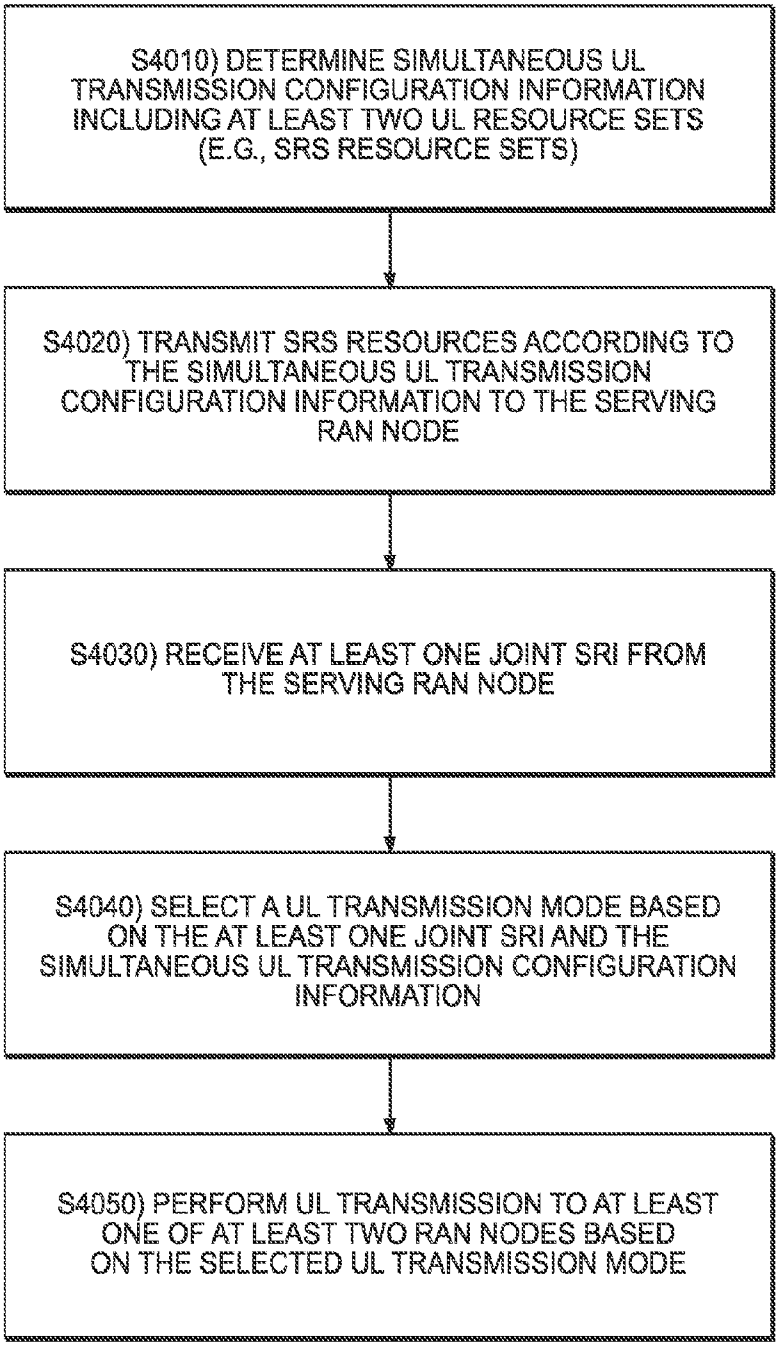
FIGS. 4-5 illustrate example flowcharts for performing simultaneous UL transmission to a plurality of TRPs according to some example embodiments.
Figure 6:
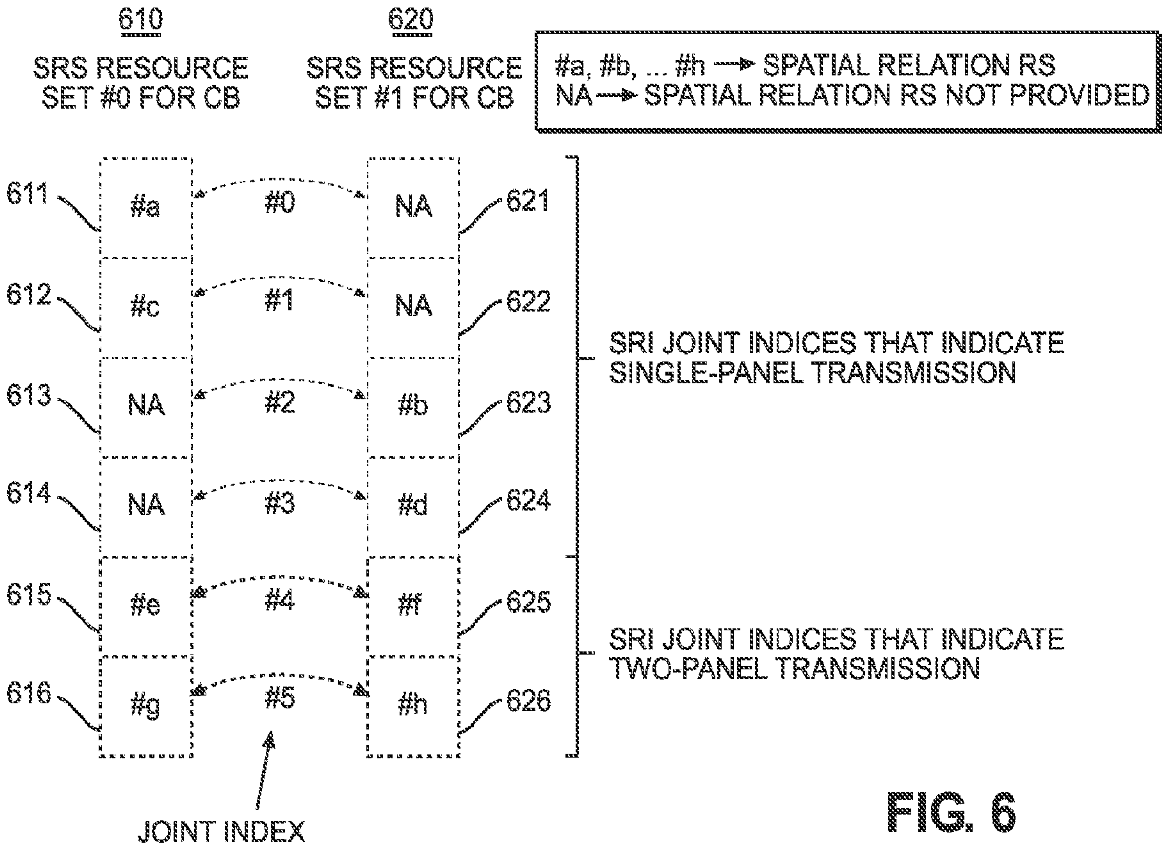
FIGS. 6-8 illustrate three example simultaneous UL transmission configuration information types according to some example embodiments.
Figure 7:
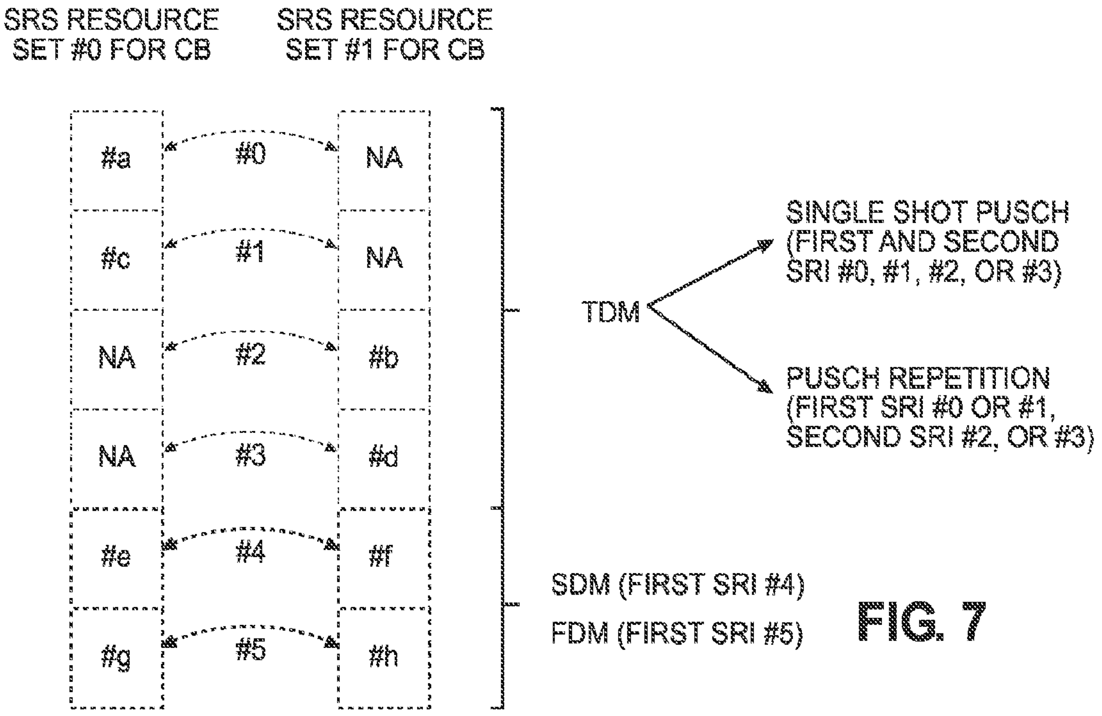
Figure 8:
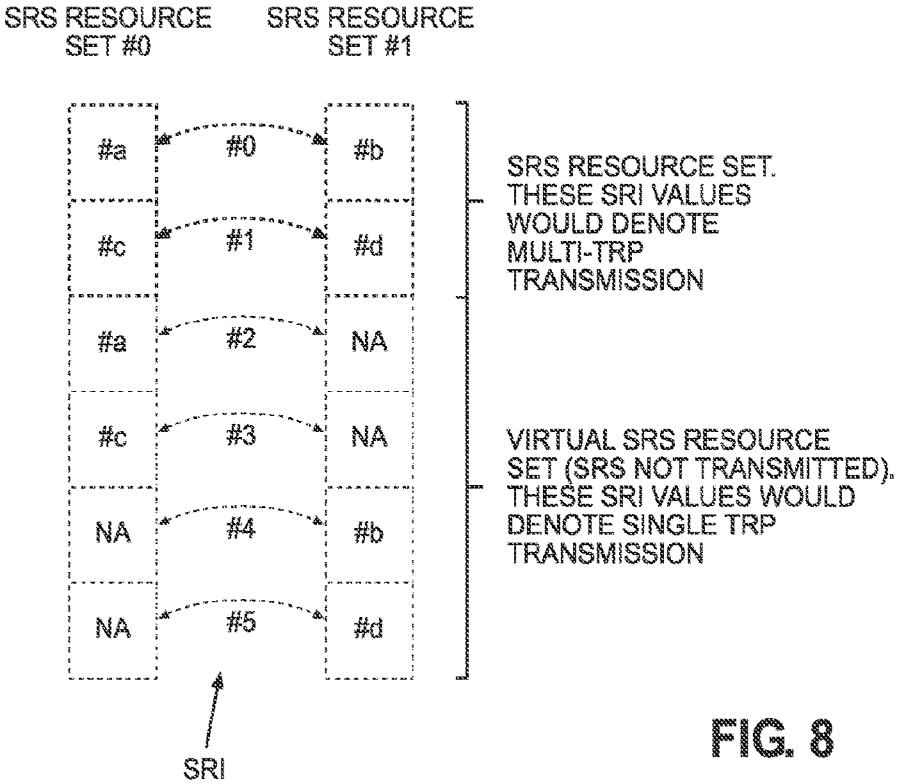
Figure 9:
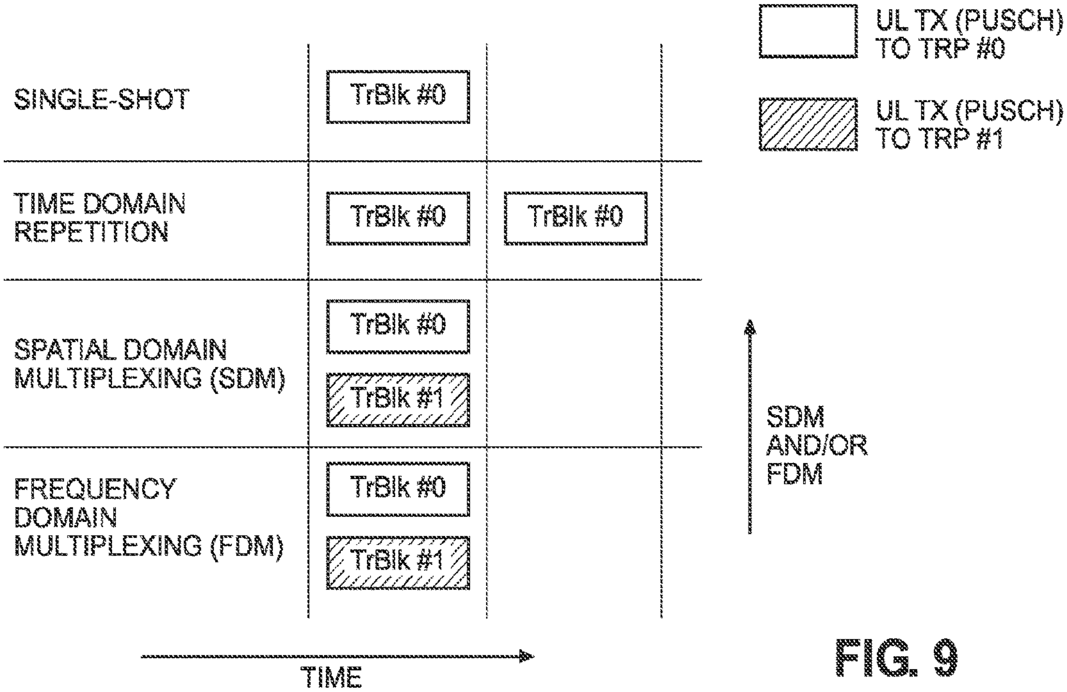
FIG. 9 is an example diagram illustrating a plurality of different UL transmission modes according to at least one example embodiment.

FIG. 4 illustrates an example flowchart for performing simultaneous UL transmission to a plurality of TRPs using a UE device according to at least one example embodiment, but the example embodiments are not limited thereto. FIGS. 6-8 illustrate three example simultaneous UL transmission configuration information types according to some example embodiments. FIG. 9 illustrates a plurality of different UL transmission modes according to at least one example embodiment. While the example embodiments use the term "simultaneous UL transmission," the example embodiments are not limited thereto, and for example, the UE device may perform "single-shot" and/or single-panel UL transmissions to one or more TRPs, as discussed in further detail below.

Referring now to FIGS. 4 and 6-9, according to at least one example embodiment, in operation S4010, a UE device, such as UE 130 of FIG. 1, etc., may determine simultaneous UL transmission configuration information (e.g., SUL TX configuration information, etc.), but the example embodiments are not limited thereto. The SUL TX configuration information may include a plurality of SRS resource sets (e.g., UL resource sets, etc.), wherein each SRS resource set is associated with a TRP of the plurality of TRPs, etc. For example, as shown in the example system diagram of FIG. 1, the UE 130 may determine the SUL TX configuration information by receiving the SUL TX configuration from a serving RAN node, e.g., RAN node 110, and the SUL TX configuration information may include a first SRS resource set associated with the RAN node 110 and a second SRS resource set associated with a secondary RAN node, such as RAN node 120, etc., but the example embodiments are not limited thereto, and the number of SRS resource sets and corresponding RAN nodes may be greater than two, and/or the UE 130 may receive the SUL TX configuration information from the core network 100, etc. Additionally, the plurality of SRS resource sets may be associated with each other using a joint index, etc. According to at least one example embodiment, the UE device 130 may receive configuration information for one or more SRS resource sets, and/or receive updated configuration information for one or more SRS resource sets via MAC control element (MAC CE), radio resource control (RRC), etc., from the serving RAN node 110 and/or the core network 100, etc., but the example embodiments are not limited thereto. Additionally, the UE device 130 may receive the joint index and/or updates to the joint index via MAC CE, RRC, downlink control information (DCI) scheduling, etc., from the serving RAN node 110 and/or the core network 100, etc., but the example embodiments are not limited thereto.

For example, as shown in FIG. 6, the SUL TX configuration information may include a first SRS resource set 610 which may be associated with a first antenna panel (and/or a second capability value set) of the UE device 130 and a second SRS resource set 620 may be associated with a second antenna panel (and/or a second capability value set) of the UE device 130, wherein the individual SRS resources 611 to 616 of the first SRS resource set 610 correspond to different beams and/or layers of the first antenna panel, etc., and the individual SRS resources 621 to 626 of the second SRS resource set 620 correspond to different beams and/or layers of the second antenna panel, etc., but the example embodiments are not limited thereto. Additionally, according to some example embodiments, additional SRS resource sets may be provided if the UE device includes additional antenna panels, etc. Further, each of the SRS resource sets 610 and 620 may each be associated with a different TRP (e.g., different RAN node, etc.), but the example embodiments are not limited thereto. For example, the first SRS resource set 610 may also be associated with the serving RAN node 110 and the second SRS resource set 620 may also be associated with the secondary RAN node 120, but the example embodiments are not limited thereto. However, the example embodiments are not limited thereto, and for example, the SUL TX configuration information may include a single SRS resource set including a set of explicitly defined, e.g., for SRS resource pairs corresponding to multi-TRP transmissions, and SRS resource pairs corresponding to single-TRP transmission may be virtually defined (e.g., not included in the SUL TX configuration information, but inferentially referenced by the serving RAN node 110 based on a joint index indication, etc. The single SRS resource set example embodiments will be discussed in further detail in connection with FIG. 8.

According to some example embodiments, each of the SRS resource sets may include a plurality of SRS resources corresponding to different transmission configuration indicator (TCI) states (and/or quasi-colocation information, DL RSs, beams, etc.) and/or NULL values, but the example embodiments are not limited thereto. The first SRS resource set 610 and the second SRS resource set 620 may include an equal number of SRS resources (and/or TCI states), and individual SRS resources in the first SRS resource set 610 and the second SRS resource set 620 may be referenced using a joint index, etc., but the example embodiments are not limited thereto. As shown in FIG. 6, joint index #0 may reference (and/or indicate, point to, etc.) SRS resource 611 in first SRS reference set 610 and also reference SRS resource 621 in second SRS reference set 620, joint index #1 may reference SRS resource 612 in first SRS reference set 610 and also reference SRS resource 622 in second SRS reference set 620, etc. Additionally, each of the individual SRS resources in the SRS resource sets 610 and 620 may include a value corresponding to a valid TCI state and/or a valid spatial relation Reference Signal (RS), shown as values #a to #h in FIGS. 6-8, or corresponding to a NULL value (and/or invalid value), which is shown as a "NA" value in FIGS. 6-8. For pairs and/or groups of SRS resources associated with the same joint index entry, the SRS resources may correspond to the same time domain (TD) resource allocation (e.g., the same OFDM symbol(s) in the slot, etc.), but the example embodiments are not limited thereto.

The UE 130 performs UL SRS transmission according to the SRS resource sets and the joint SRI indices that the UE 130 was configured with. Each joint index corresponds to a resource from one SRS resource set and a resource from one or more other resource sets. For each joint index, the UE 130 will transmit SRS in accordance with the resources corresponding to the joint index in the SRS resource set(s). For resources with a valid spatial relation RS and/or a valid TCI state, the UE 130 will transmit SRS with the panel and beam associated with the indicated spatial relation RS and/or the indicated valid TCI state, etc. A NULL value (e.g., invalid value) for a SRS resource indicates that the UE device 130 does not perform UL SRS transmission on the associated antenna panel and/or to the associated RAN node for that SRS resource. For example, for joint index entry #0, the UE device 130 performs UL SRS transmission to serving RAN node 110 using TCI #a of a first antenna panel, and does not perform UL SRS transmission to secondary RAN node 130 using a second antenna panel, etc., but the example embodiments are not limited thereto.

Turning back to FIG. 4, in operation S4020, the UE device 130 may transmit a plurality of SRS resources according to the SUL TX configuration information to the serving RAN node 110, or in other words, may transmit the SRS resources 611 to 616 corresponding to the serving RAN node 110 and/or may transmit the SRS resources 621 to 626 to the secondary RAN node 120, etc., but the example embodiments are not limited thereto. Then, in operation S4030, the UE device 130 may receive at least one joint SRI from the serving RAN node 110 in response to the transmitted SRS resources, wherein the joint SRI corresponds to the joint index entry of the SUL TX configuration information, etc.

However, in at least one example embodiment, the joint SRI may correspond to a virtual joint index entry of a SRS resource set, e.g., a joint index entry which does not point to an explicitly defined entry in the SRS resource set(s), etc. Further discussion of virtual joint indices will be found in connection with FIG. 8. According to at least one example embodiment, the at least one joint SRI may be selected by the serving RAN node 110 based on a comparison of the SRS resources of the SRS resource set(s) according to one or more desired metrics, such as channel quality metrics (e.g., channel quality indicator (CQI), etc.), interference metrics, TX power levels metrics, signal to noise ratio metrics, latency metrics, bandwidth metrics, reliability metrics, etc. For example, the serving RAN node 110 may select the best SRS resource(s) to the UE device 130, etc., based on the desired metrics.

In operation S4040, the UE device 130 may select a UL transmission mode based on the at least one joint SRI and the SUL TX configuration information. More specifically, the UE device 130 may determine which SRS resource pairs (and/or SRS resource groups, etc.) the at least one joint SRI corresponds to in each of the SRS resource sets of the SUL TX configuration information, and determines the UL transmission mode based on the SRS resource pairs identified by and/or corresponding to the at least one joint SRI, etc.

Referring now to FIG. 9, FIG. 9 illustrates an example of four different UL transmission modes, e.g., a single-shot UL transmission mode (e.g., a single-panel transmission mode, a single-shot PUSCH transmission mode, etc.), a TDM UL repetition transmission mode (e.g., a single-panel repeating transmission mode, a PUSCH repetition transmission mode, etc.), a simultaneous SDM transmission mode (e.g., SDM UL transmission mode, SDM PUSCH transmission mode, etc.), and/or a simultaneous FDM transmission mode (e.g., FDM UL transmission mode, FDM PUSCH transmission mode, etc.), performable by the UE device 130, but the example embodiments are not limited thereto. As shown in FIG. 9, the single-shot UL transmission mode refers to transmitting at least one UL transmission block, e.g., at least one PUSCH transmission, to a single TRP using any one of the UE antenna panels and/or capability value sets or (UL) TCI states, etc. The (multi-TRP) TDM UL repetition transmission mode refers to transmitting at least two different UL transmission blocks using beam diversity (and/or using different antenna panels) by transmitting PUSCH to at least two different TRPs in different TD resource blocks (e.g., time slots, subslots, OFDM symbols, etc.), but the example embodiments are not limited thereto. The SDM transmission mode refers to performing simultaneous SDM transmissions during the same time block with the same frequency domain resources or during at least partially overlapping in time blocks but using different antenna panels and/or (UL) TCI states, etc. Similar to SDM transmission mode, the FDM transmission mode refers to performing simultaneous FDM transmissions during the same time block or during at least partially overlapping in time blocks but using different frequency domain resources and/or (UL) TCI states, etc.

Referring now to FIGS. 6 to 8, FIGS. 6 to 8 illustrate examples of three different types of SUL TX configuration information types, but the example embodiments are not limited thereto. According to some example embodiments, the serving RAN node 110 and/or the UE device 130 may select and/or determine the UL transmission mode based on the type of SUL TX configuration information used by the UE device 130 and the at least one joint SRI as shown in FIGS. 6 to 8, but the example embodiments are not limited thereto. For example, FIG. 6 corresponds to a SUL TX configuration information which is used when a single joint SRI is transmitted by the serving RAN node 110 to indicate the UL transmission mode type. In FIG. 6, the SUL TX configuration information may define SRS resource pairs (and/or groups) as being either a single-panel transmission mode (e.g., a single-shot transmission mode) or a two-panel transmission mode (e.g., SDM transmission or FDM transmission mode), but the example embodiments are not limited thereto. As shown in FIG. 6, the SRS resource pairs corresponding to joint SRI entries #0 to #3 are associated with single-panel transmission modes because only one SRS resource is defined and/or valid for each SRS resource pair, e.g., for joint SRI entry #0, only the SRS resource 611 is valid while the SRS resource 621 is NULL/invalid, and for joint SRI entry #2 SRS resource 613 is NULL/invalid while the SRS resource 623 is valid, etc. Additionally, the SRS resource pairs corresponding to joint SRI entries #4 to #5 are associated with multi-panel transmission modes (e.g., either SDM transmission mode or FDM transmission mode) because both of the SRS resources are valid, e.g., for joint SRI entry #4, both the SRS resource 615 and the SRS resource 625 have valid entries, etc.

As a second example, FIG. 7 corresponds to a SUL TX configuration information which is used when two joint SRI are transmitted by the serving RAN node 110 to indicate the UL transmission mode type, but the example embodiments are not limited thereto. In FIG. 7, the SRS resource pairs corresponding to joint SRI entries #0 to #3 correspond to TDM transmissions (assuming the UE device 130 is configured to perform UL repetitions, etc.), and the UE device 130 transmits using either the single-shot transmission type (e.g., using one (UL) TCI state, etc.) or the TDM repetition transmission type (e.g., using two (UL) TCI states, etc.) based on whether the first joint SRI and the second joint SRI have the same TDM-related value or not (e.g., whether the first SRI and the second entry both point to one of joint index #0 to #3). In the event that both joint SRI have the same (TDM-related) value, e.g., both the first SRI and the second SRI transmitted by the serving RAN node 110 indicate joint SRI #0, or both the first and second SRI indicate joint SRI #1, etc., then the selected transmission mode is the single-shot transmission mode. In the event that the first SRI and the second SRI have different values within the subset of TDM-related joint index entries, then the UE device 130 transmits using the TDM repetition type using the different SRS resources identified by the first joint SRI and the second joint SRI. For example, if the first joint SRI value is index #0 and the second joint SRI value is index #2, the UE device 130 transmits a first PUSCH block to the serving RAN node 110 using SRS resource #a at a time slot 0, and the UE device 130 transmits a second PUSCH block to the secondary RAN node 120 using SRS resource #b at a time slot 1, etc., but the example embodiments are not limited thereto.

Moreover, in the event that the first SRI and/or the second SRI corresponds to a non-TDM related SRS resource pair, e.g., joint index entries #4 to #5, etc., the UE device 130 transmits using SDM transmission mode or FDM transmission mode based on which non-TDM joint SRI entry is indicated. For example, in FIG. 7, joint SRI entry #4 corresponds to a simultaneous SDM transmission mode using SRS resources #e and #f, and joint SRI entry #5 corresponds to a simultaneous FDM transmission mode using SRS resources #g and #h, but the example embodiments are not limited thereto, and there may be a greater or lesser number of SDM-related SRS resources and/or FDM-related SRS resources defined in the SRS resource sets, etc.

According to some example embodiments, a simultaneous UL transmission mode may be a multi-TRP UL transmission mode, e.g., the simultaneous UL transmissions may correspond to different capability value sets (and/or panels) and/or different (UL) TCI states and different TRPs, or single-TRP UL transmission mode, e.g., the simultaneous UL transmissions may correspond to different capability value sets (and/or panels) and/or different (UL) TCI states but the same TRP. It is also noted that, in some example embodiments, there may be a need to differentiate or switch between multi-TRP simultaneous UL transmission mode and single-TRP simultaneous UL transmission mode (as these modes may correspond to different transmission block mapping), in which case an indication in DCI, MAC CE and/or RRC may be used in addition to the two indicated SRIs, etc., but the example embodiments are not limited thereto. Specifically, if the indication indicates to use single-TRP mode, the UE 130 may also check whether the two indicated SRIs are the same or not (or one indicates a reserved entry/value or not), and the UE 130 may determine to use single-TRP simultaneous UL transmission mode if the two SRIs are different (and use single-TRP single-panel UL transmission mode if one SRI indicates a reserved entry or value); on the other hand, if the indication indicates to use multi-TRP mode, the UE 130 may check whether the two indicated SRIs are the same or not, and the UE 130 may determine to use multi-TRP simultaneous UL transmission mode if the two SRIs are different, etc., but the example embodiments are not limited thereto.

In at least one additional example embodiment, TPMI may be used to switch or differentiate between multi-TRP simultaneous UL transmission mode and single-TRP simultaneous UL transmission mode, etc. Specifically, if the indicated one (or more) TPMI corresponds to a value corresponding to, desiring, and/or requiring coherence between antenna ports across two or more panels (and/or capability value sets, etc.), or this value may be from a subset of TPMI values configured for single-TRP simultaneous UL transmission mode, etc., the UE 130 may use single-TRP simultaneous UL transmission mode; otherwise, if the indicated one (or more) TMPI does not correspond to, desire, and/or does not require coherence (e.g., no coherence) between the antenna ports across two or more panels (and/or capability value sets), or this value is from a subset of TPMI values configured for multi-TRP simultaneous UL transmission mode, etc., the UE may use multi-TRP simultaneous UL transmission mode.

In at least one additional example embodiment, the switching between single-TRP UL transmission mode and multi-TRP UL transmission mode, and/or between multi-TRP UL transmission modes, and/or between single-TRP UL transmission modes may be done at least partially based on UE reporting, such as beam reporting or CSI reporting, etc., but the example embodiments are not limited thereto. Specifically, the UE 130 may indicate whether, e.g., at least one pair of (UL) TCI states and/or beams, which are identified in the UE reporting by one or more synchronization signal block (SSB) resource indicators (SSBRIs) and/or CSI-RS resource indicators (CRIs) (or even SRS resource(s)) and their corresponding capability value set indexes (e.g., implicitly indicating panels) (the reporting may include L1-RSRP/L1-SINR information for the reported resources), may be used for simultaneous UL transmission mode; such indication in the reporting may follow a corresponding RRC configuration, etc., but is not limited thereto. Then, if the serving RAN node 110 (e.g., gNB, etc.) indicates a pair of (UL) TCI states for which the UE 130 has indicated the possibility/capability to perform simultaneous UL transmission mode, the UE 130 may use this mode, etc. Whereas, if the serving RAN node 110 indicates a pair of (UL) TCI states for which the UE 130 has indicated the possibility/capability to not perform simultaneous UL transmission mode, e.g., only TDM UL transmission mode is possible, etc., the UE 130 may use the TDM UL transmission mode, etc. Alternatively, or additionally, the UE 130 may report (within beam or CSI reporting or as a separate reporting) capability on whether the UE 130 can achieve (full and/or partial) coherence or not across two (or more) capability value sets or panels, etc. This information may allow the serving RAN node 110 to decide whether to schedule UL transmission using multi-TRP simultaneous UL transmission and/or single-TRP simultaneous UL transmission mode, and thus to switch or differentiate between such modes if desired and/or needed. If the UE 130 reports one or more SSBRI and/or CRI corresponding to two capability value sets for which the UE 130 also indicates coherence between these capability value sets, and if the serving RAN node 110 then indicates two TCI states corresponding to these capability value sets, the UE 130 may apply single-TRP simultaneous UL transmission mode, etc. On the other hand, if the UE 130 reports one or more SSBRI and/or CRI corresponding to two capability value sets for which the UE 130 also indicates coherence between these capability value sets, and if the serving RAN node 110 then indicates two TCI states corresponding to these capability value sets, the UE 130 may apply multi-TRP simultaneous UL transmission mode, etc., but the example embodiments are not limited thereto.

According to some example embodiments, the UE reporting, e.g., the CSI report and/or beam report, etc., may be transmitted by the UE device 130 to the serving RAN node 110, etc., prior to operation S4010 of FIG. 4, or may be included in operation S4010, but the example embodiments are not limited thereto. For example, the CSI report may include information regarding N beam pairs (and/or N beam groups), wherein N is an integer>=1 and corresponds to the number of antenna panels of the UE device 130, but the example embodiments are not limited thereto. For the sake of clarity and convenience, it will be assumed that there are only beam pairs, but the example embodiments are not limited thereto, and for example, there may be beam groups including three or more beams, etc. Each beam pair included in the CSI or beam report correspond to a channel measurement report (CMR) pair which can be received simultaneously by the UE 130. The beam pairs in the UE reporting may be reported by the UE 130 to support simultaneous DL transmission (e.g., DL NCJT). The SUL TX configuration information may then be based on the UE 130's configuration for simultaneous DL transmission, e.g., the spatial relation information and/or TCI state of the SRS resources, etc., in the SUL TX configuration may be based on the CMR pairs reported by the UE 130 and/or assigned for UE 130's use with DL NCJT, but the example embodiments are not limited thereto. For each pair of reported CMRs (e.g., pair of beams, pair of SSB/CSI resources, etc.), a first CMR of the pair of CMRs is assumed to be transmitted to a first TRP, and the second CMR of the pair of CMRs is assumed to be transmitted to a second TRP, etc. Additionally, the SUL TX configuration information may include N SRS resource sets whose spatial relation info and/or TCI states are based on the reported CMR pairs, but is not limited thereto. For example, using FIG. 6 as an example (and assuming that the SRS resources sets illustrated in FIG. 6 were prepared based on a CSI or beam report and N=2), the CSI report may include a first SRS resource set 610 and a second SRS resource set 620, wherein the first SRS resource set 610 may include SRS resources which correspond to the spatial relations associated with the CMRs from the first TRP (e.g., #a and #c) or null SRS resources, and the second SRS resource set include spatial relations associated with the CMRs from the second TRP (e.g., #b or #d) or null SRS resources, etc., but the example embodiments are not limited thereto, and for example, the CSI report may be used to generate the SUL TX confirmation information corresponding to the example embodiments of any one of FIGS. 6 to 8, etc. Similar to the example embodiments wherein the SRS resource sets are not derived based on UE reporting, as shown in FIG. 6, the joint indices #0 to #3 may correspond to single-TRP transmission (e.g., single-panel transmission, etc.) wherein joint indices #0 to #1 may correspond to single-panel transmission to the first TRP, and joint indices #2 to #3 may correspond to single-panel transmission to the second TRP, etc. Additionally, as shown in FIG. 6, the joint indices #4 to #5 may correspond to multi-TRP transmission (e.g., multi-panel transmission, etc.) and/or simultaneous transmission to both the first TRP and the second TRP, etc., but the example embodiments are not limited thereto. The UE device 130 may transmit SRS to the serving RAN node 110 by cycling through SRS transmission on one UE panel (e.g., #a first, and #c second), then the SRS transmission on the other UE panel (e.g., #b third, and #d fourth), and then both UE panels together simultaneously (e.g., #a+#b fifth, and #c+#d sixth), etc., but the example embodiments are not limited thereto. Then the serving RAN node 110 may assess from the SRS reception whether the UE device 130 should transmit UL (e.g., PUSCH, etc.) using single-TRP or multi-TRP, etc., and then indicate the selected UL transmission mode to the UE device 120 using the SRI corresponding to the selected joint index entry, etc., but the example embodiments are not limited thereto.

Additionally, according to some example embodiments, the UE device 130 may transmit the CSI report in connection with its configuration for simultaneous DL transmission configuration information, e.g., CMR pairs reported by the UE 130 and/or assigned for the UE 130's use with DL NCJT, etc., but the example embodiments are not limited thereto. The SUL TX configuration information may then be based on the UE 130's configuration for simultaneous DL transmission, e.g., the spatial relation information and/or TCI state of the SRS resources, etc., may be based on the CMR pairs reported by the UE 130 and/or assigned for use by the UE 130 with DL NCJT but the example embodiments are not limited thereto.

According to some example embodiments, in addition to the joint SRI index, there may be a separate indication, e.g., via a separate/new DCI field or using the existing 2-bit DCI field, to indicate whether to apply multi-TRP UL, such as multi-TRP SDM or multi-TRP FDM, or single-TRP UL, such as single-TRP single-panel UL or single-TRP multi-panel simultaneous UL transmission (which may be SDM or FDM). This DCI indication may allow for the indication of a subset of joint indices, which will improve the efficiency of the SUL TX configuration information by decreasing the required SRI field size, etc. For example, assuming a 2-bit DCI indication field, an indication value (e.g., indication entry) of, e.g., "10" and/or "11" may indicate multi-TRP UL operation and an indication value of, e.g., "00" may indicate a single-TRP UL to the first TRP, and an indication value of, e.g., "01" may indicate a single-TRP UL to the second TRP, etc., but the example embodiments are not limited thereto. Then, the serving RAN node 110 may transmit a joint SRI index corresponding to a subset of the total set of joint indices for the SRS resource sets depending on whether single-TRP UL transmission mode or a multi-TRP UL transmission mode is selected.

Referring again to FIG. 6 as an example of the SRS resource sets, if the DCI indicator value indicates multi-TRP operation, e.g., "10" or "11", an SRI value of "0" may indicate joint SRI index #4, and an SRI value of "1" may indicate joint SRI index #5, etc., but the example embodiments are not limited thereto. As another example, if the DCI indicator value indicates single-TRP UL to the first TRP, e.g., "00", then an SRI value of "0" indicates joint SRI index #0 and an SRI value of "1" indicates joint SRI index #1, etc. Additionally, according to some example embodiments, a DCI indication value of "11" may be used to indicate a multi-TRP TDM UL operation and/or single-TRP simultaneous UL transmission operation, etc.

As another example, assuming a 1-bit DCI indication is used instead of a 2-bit DCI indication, a DCI indication value of "1" may indicate multi-TRP UL operation (or single-TRP simultaneous UL transmission operation), and the indicated joint SRI index is fetched from the subset of joint SRI indices corresponding to multi-TRP UL operation. In this case, an SRI value of "0" may indicate a joint SRI index #4, and a SRI value "1" may indicate joint SRI index #5, but the example embodiments are not limited thereto. Further, a DCI indication value/entry of "0" may indicate single TRP UL corresponding to either TRP1 or TRP2 (e.g., SRS resource set #0 or #1, a first capability value set or a second capability value set, etc.). In this case, a SRI value of "0" may indicate joint SRI index #0, a SRI value of "1" may indicate joint SRI index #1, a SRI value of "2" may indicate SRI index #2, and a SRI value of "3" may indicate SRI index #3, etc., but the example embodiments are not limited thereto. According to some example embodiments, the TRP to be used may be indicated via RRC, etc., or a toggling between the first TRP and the second TRP may be used, etc. In this case, the UE 130 is assumed to already know/be configured to know which subset of SRI indices to consider/use at a given and/or desired time, e.g., using the joint indices corresponding to the first TRP at time X (and/or slot X, symbol X, etc.), and using the joint indices corresponding to the second TRP at time Y (and/or slot Y, symbol Y, etc.), but the example embodiments are not limited thereto.

Referring now to FIG. 8, FIG. 8 illustrates a SUL TX configuration information (e.g., a virtual SUL TX configuration information) wherein joint indices are explicitly defined for the SRS resource pairs corresponding to multi-TRP transmissions, and joint indices are virtually and/or implicitly defined for single-TRP transmissions, but the example embodiments are not limited thereto. As shown in FIG. 8, only the SRS resource pairs corresponding to joint SRI #0 and #1 are defined in the SUL TX configuration information, e.g., SRS resource pairs corresponding to multi-TRP transmissions, etc., wherein if the serving RAN node 110 transmits joint SRI #0 to the UE device 130, the UE device 130 performs SDM transmission or FDM transmission using SRS resource #a on the first antenna panel of the UE device 130 and SRS resource #b on the second antenna panel of the UE device 130. And if the serving RAN node 110 transmits joint SRI #1, the UE device 130 performs SDM transmission or FDM transmission using SRS resource #c on the first antenna panel of the UE device 130 and SRS resource #d on the second antenna panel, etc. Additionally, the UE device 130 may independently and/or implicitly extend the SUL TX configuration information by defining virtual SRS resource pairs which were not previously and/or explicitly defined by the serving RAN node 110, e.g., joint SRI entries #2 to #5 shown in FIG. 8. These virtual SRS resources correspond to single TRP transmissions using either the first antenna panel (e.g., joint SRI entries #2 and #3) or the second antenna panel (e.g., joint SRI entries #4 and #5), etc., but the example embodiments are not limited thereto.

Returning to FIG. 4, in operation S4040, the UE device 130 selects the UL transmission mode based on the at least one joint SRI received from the serving RAN node 110, as discussed above in connection with FIGS. 6 to 9, and the SUL transmission configuration information, etc. And then in operation S4050, the UE device 130 performs UL transmission to one or more of the serving RAN node 110 and the secondary RAN node 120, etc., based on the selected UL transmission mode, etc.

However, the example embodiments are not limited thereto, and according to some example embodiments, the UE device 130 may select a UL transmission mode and transmit UL (e.g., PUSCH and/or PUCCH) based on the SUL TX configuration information and a desired UL transmission threshold, e.g., a timer-based validity. More specifically, according to some example embodiments, the UE device 130 may select the UL transmission mode based on the amount of time (and/or slots, symbols, etc.) which have elapsed between the transmission of the SRS resources in operation S4020 and the receiving of a DCI scheduling the UL transmission on the SRI index referring to the SRS resource(s) from the serving RAN node 110 in operation S4030, and determining whether the amount of time (and/or slots, symbols, etc.) has elapsed has exceeded the desired UL transmission threshold. For example, if the amount of time elapsed between operations S4020 and S4030 has not exceeded the desired UL transmission threshold, the UE may transmit UL (e.g., PUSCH/PUCCH) based on (and/or using) the transmitted SRS resources, etc. In at least one example embodiment, if the amount of time elapsed has exceeded the desired UL transmission threshold, the UE 130 may not transmit joint transmission based on and/or using the transmitted SRS resources, and the UE 130 may perform only a single PUSCH/PUCCH transmission (e.g., single-shot transmission) on a default joint SRI index (e.g., the lowest joint index, the highest joint index, configured default index etc.), but the example embodiments are not limited thereto. According to some example embodiments, the timer-based validity be used in conjunction with the DCI scheduling of the joint SRI, and for example, the timer-based validity may apply for inter-cell operation (e.g., inter-cell beam management (BM) and/or inter-cell multi-TRP, etc.), and/or intra-cell operation (e.g., intra-cell BM and/or intra-cell multi-TRP, etc.), and the DCI scheduling of the joint SRI is used for all other situations, but the example embodiments are not limited thereto. The timer value for the timer-based validity as described herein may be configured by the core network 100 (e.g. via RRC signaling, etc.) and/or defined in the communication specification (e.g., 5G specification, etc.), but the example embodiments are not limited thereto.

Additionally, according to some example embodiments, the SRS resources included in the SUL TX configuration information may correspond to and/or may be associated with different cells, e.g., identified by physical cell ID (PCI) and/or identified using any other identifier which may associate a PCI and a cell, etc. For example, the UE device 130 may be configured with inter-cell multi-TRP and/or inter-cell beam management, wherein the UE device 130 may transmit and/or receive UL/DL channels and signals from a serving cell and a cell with a different PCI than the serving cell, but the example embodiments are not limited thereto. The serving cell and the second cell (e.g. the cell with different PCI) may correspond to and/or may be associated with the same RAN node (e.g., serving RAN node 110, etc.) and/or may correspond to and/or may be associated with different RAN nodes, e.g., serving RAN node 110 and second RAN node 120, etc., but the example embodiments are not limited thereto. In at least one example embodiment, the UE device 130 may select a UL transmission mode and transmit UL (e.g., PUSCH and/or PUCCH) based on the SUL TX configuration information and the PCI indicated by the serving RAN node 110. More specifically, the UE device 130 may receive a UL TCI state associated for a particular cell and/or PCI from the serving RAN node 110, etc. If the UE device 130 determines that the indicated UL TCI state(s) is/are associated with two different PCI (e.g., two different cells, etc.), the UE device 130 determines that the UL transmission mode is a joint transmission mode (e.g., SDM transmission or FDM transmission using the indicated SRS resources) and performs the UL transmission, etc. In other words, if UE 130 has been configured with two SRS resources sets that are associated with RS that are associated with different PCIs and configured with SRI index for SUL TX, the UE 130 performs SUL transmission in response to being indicated with UL TCI states for the respective PCIs (e.g., UE 130 is configured to transmit uplink to both cells, etc.). However, if the UE device 130 determines that the received UL TCI state(s) is/are associated with a single PCI (e.g., for one or more RS configured as TCI state are associated with single PCI, etc.), the UE 130 determines that the UL transmission mode is a single transmission mode (e.g., single-shot transmission mode or TDM repetition mode) and transmits UL using the SRS resource associated with the same PCI as the current UL TCI state (e.g. it does not consider the SRI index indicating SUL transmission as joint transmission mode to multiple cells or TRPs), etc., but the example embodiments are not limited thereto. In any of the example embodiments, the UL TCI state may be indicated explicitly using an indication for UL TCI state (e.g., where DL and UL TCI states are separately indicated) or using a joint TCI state indication where the same TCI state is applied for DL and UL, etc.

Figure 5:
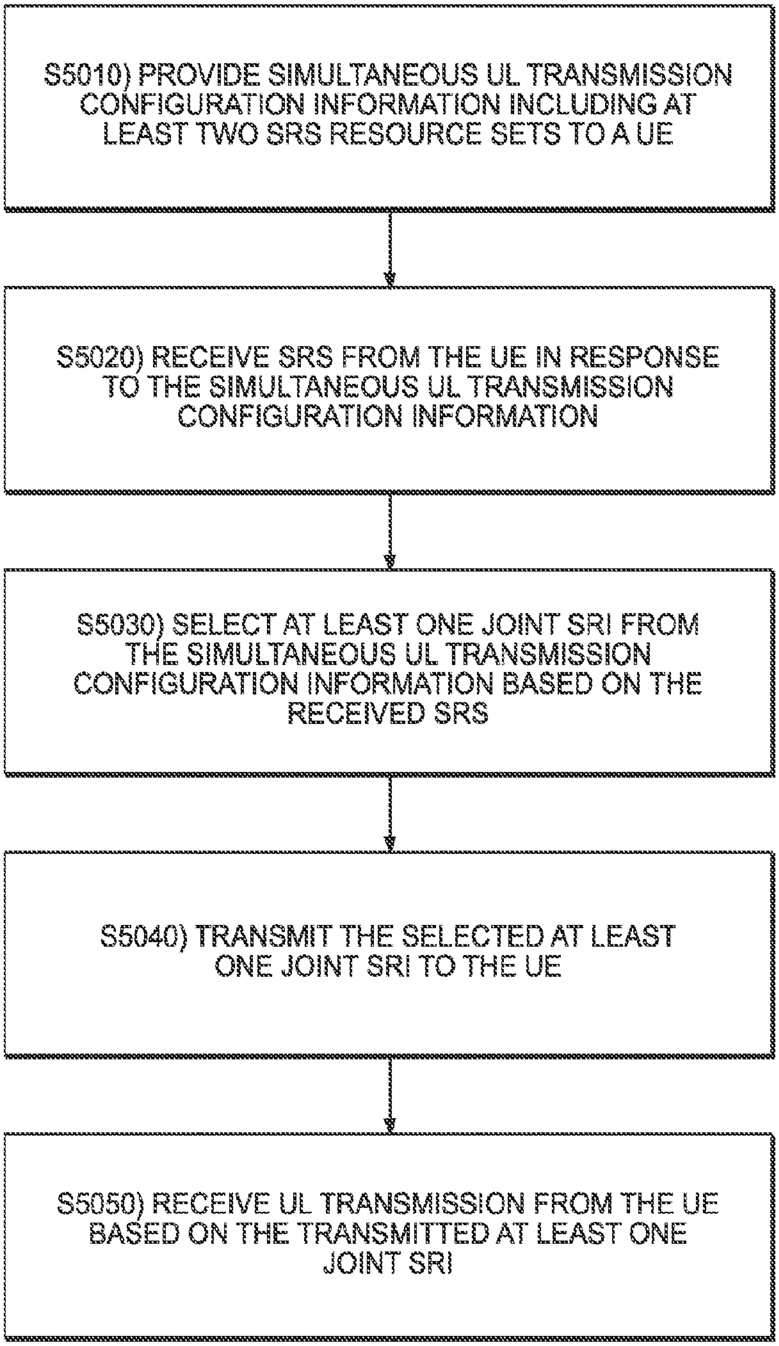

FIG. 5 illustrates an example flowchart for receiving simultaneous UL transmission from a UE device using a RAN node according to at least one example embodiment, but the example embodiments are not limited thereto.

According to at least one example embodiment, in operation S5010, a RAN node, such as RAN node 110 of FIG. 1, etc., may provide simultaneous UL transmission configuration information to at least one UE device, such as UE device 130 of FIG. 1, etc., but the example embodiments are not limited thereto. As discussed in connection with FIGS. 6 to 8, the SUL TX configuration information may include at least two SRS resources sets each corresponding to a different antenna panel of the UE device 130. Additionally, each of the SRS resource sets may also be associated with a different TRP and/or RAN node, such as serving RAN node 110 and secondary RAN node 120, but the example embodiments are not limited thereto, and there may be greater than two SRS resource sets, antenna panels, and/or RAN nodes, etc. The RAN node 110 may transmit the SUL TX configuration information using MAC CE and/or RRC, but the example embodiments are not limited thereto. According to some example embodiments, the SUL TX configuration information may be provided via a CSI report which defines SRS resource sets for simultaneous DL transmission configuration information (e.g., DL NCJT, etc.), but the example embodiments are not limited thereto. In operation S5020, the serving RAN node 110 receives SRS from the UE device 130 in response to providing the SUL TX configuration information to the UE device 130. The serving RAN node 110 estimates the UL channels based on the received SRS. In operation S5030, the serving RAN node 110 determines the UL transmission mode in which the UE device 130 will operate based on the received SRS (e.g., based on the UL channel estimates), and selects at least one joint SRI from the SUL TX configuration information corresponding to the determined UL transmission mode. For example, the serving RAN node 110 may select the at least one joint SRI based on a comparison of the SRS resources of the SRS resource set(s) according to one or more desired metrics, such as channel quality metrics (e.g., channel quality indicator (CQI), etc.), interference metrics, TX power levels metrics, signal to noise ratio metrics, latency metrics, bandwidth metrics, reliability metrics, etc. In operation S5040, the serving RAN node 110 transmits the selected at least one joint SRI to the UE device 130 via MAC CE, RRC, and/or DCI, etc., but is not limited thereto. However, the example embodiments are not limited thereto, and the serving RAN node 110 may perform timer-based validity to indicate the selected UL transmission mode by transmitting the at least one joint SRI to the UE device 130 at a desired time (and/or during a desired slot, a desired subslot, a desired ODFM symbol, etc.), etc. In operation S5050, the serving RAN node 110 receives UL transmissions from the UE device 130 based on the transmitted at least one joint SRI.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
a memory storing computer readable instructions; and
processing circuitry configured to execute the computer readable instructions to cause the device to:
determine simultaneous uplink (UL) transmission configuration information, the simultaneous UL transmission information including at least a first sounding reference signal (SRS) resource set and a second SRS resource set;
transmit SRS according to the simultaneous UL transmission configuration information to at least a serving RAN node;
receive a joint SRS resource indicator (SRI) from the serving RAN node;
perform at least one UL transmission based on the joint SRI and the simultaneous UL transmission configuration information; and
receive a second joint SRI that corresponds to a NULL entry in either the first SRS resource set or the second SRS resource set for single-shot UL transmission and to valid entries in the first SRS resource set and the second SRS resource set for multi-UL transmission, the second joint SRI being different than the joint SRI in response to a selected UL transmission mode being a spatial-domain multiplexed (SDM) multi-UL transmission mode.

2. The device of claim 1, wherein
the joint SRI corresponds to an entry in the first SRS resource set and the second SRS resource set; and
the processing circuitry is further configured to execute the computer readable instructions to cause the device to,
determine UL resources in each of the first and second SRS resource sets corresponding to the joint SRI, and
perform the at least one UL transmission to at least one of the serving RAN node and a second RAN node based on the determined UL resources.

3. The device of claim 1, wherein
the first SRS resource set and the second SRS resource set have a same number of UL resources; and
the first SRS resource set and the second SRS resource set each includes at least one single-UL resource and at least one multi-UL resource.

4. The device of claim 1, wherein
the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state; and
the second SRS resource set includes at least one second NULL resource corresponding to the at least one first single-UL transmission resource,
at least one second single-UL transmission resource corresponding to at least one second UL TCI state, the at least one second single-UL transmission resource corresponding to the at least one first NULL resource, and
at least one second multi-UL transmission resource corresponding to the at least one second UL TCI state, the at least one second multi-UL transmission resource corresponding to the at least one first multi-UL transmission resource.

5. The device of claim 1, wherein the processing circuitry is further configured to execute the computer readable instructions to cause the device to:
determine a UL transmission mode based on the joint SRI, the first SRS resource set, and the second SRS resource set; and
perform the at least one UL transmission based on the determined UL transmission mode.

6. The device of claim 5, wherein the UL transmission mode is one of a single-shot UL transmission mode, a time-domain multiplexed (TDM) UL repetition mode, the SDM multi-UL transmission mode, and a frequency-domain multiplexed (FDM) multi-UL transmission mode.

7. The device of claim 6, wherein the processing circuitry is further configured to execute the computer readable instructions to cause the device to:
perform the at least one UL transmission to one of the serving RAN node or a second RAN node in response to the determined UL transmission mode being the single shot UL transmission mode;
perform the at least one UL transmission to the serving RAN node and the second RAN node in consecutive TDM slots or subslots in response to the determined UL transmission mode being the TDM UL repetition mode; and
perform the at least one UL transmission to the serving RAN node and the second RAN node simultaneously in response to the determined UL transmission mode being the SDM multi-UL transmission mode or the FDM multi-UL transmission mode.

8. The device of claim 6, wherein the processing circuitry is further configured to execute the computer readable instructions to cause the device to:

receive the second joint SRI from the serving RAN node; and determine the UL transmission mode based on the joint SRI, the second joint SRI, the first SRS resource set, and the second SRS resource set.

9. The device of claim 1, wherein the processing circuitry is further configured to execute the computer readable instructions to cause the device to determine the simultaneous UL transmission configuration information based on simultaneous DL transmission configuration information.

10. The device of claim 1, wherein the processing circuitry is further configured to execute the computer readable instructions to cause the device to determine the simultaneous UL transmission configuration information by receiving the simultaneous DL transmission configuration information from the serving RAN node.

11. A radio access network (RAN) node comprising:

a memory storing computer readable instructions; and processing circuitry configured to execute the computer readable instructions to cause the node to:

provide simultaneous uplink (UL) transmission configuration information to a user equipment (UE) device, the simultaneous UL transmission information including at least a first sounding reference signal (SRS) resource set and a second SRS resource set;

receive SRS from the UE according to the simultaneous UL transmission configuration information;

select a joint SRS indicator (SRI) from the simultaneous UL transmission configuration information based on the received SRS;

transmit the selected joint SRI to the UE device; and transmit a second joint SRI to the UE device that corresponds to a NULL entry in either the first SRS resource set or the second SRS resource set for single-shot UL transmission and to valid entries in the first SRS resource set and the second SRS resource set for multi-UL transmission, the second joint SRI being different than the joint SRI in response to a selected UL transmission mode being a spatial-domain multiplexed (SDM) multi-UL transmission mode.

12. The RAN node of claim 11, wherein the joint SRI corresponds to an entry in the first SRS resource set and the second SRS resource set; and the transmitted joint SRI causes the UE device to determine UL resources in each of the first and second SRS resource sets corresponding to the joint SRI.

13. The RAN node of claim 11, wherein the first SRS resource set includes at least one first single-UL transmission resource corresponding to at least one first UL transmission configuration indicator (TCI) state, at least one first NULL resource, and at least one first multi-UL transmission resource corresponding to the at least one first UL TCI state; and the second SRS resource set includes at least one second NULL resource corresponding to the at least one first single-UL transmission resource, at least one second single-UL transmission resource corresponding to at least one second UL TCI state, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

14. The RAN node of claim 11, wherein the processing circuitry is further configured to execute the computer readable instructions to cause the node to:

select the UL transmission mode for the UE device;

transmit the joint SRI to the UE device, the joint SRI being a first joint SRI which corresponds to the selected UL transmission mode; and receive UL transmission from the UE device based on the selected UL transmission mode.

15. The RAN node of claim 14, wherein the UL transmission mode is one of a single shot UL transmission mode, (TDM) UL repetition mode, the SDM multi-UL transmission mode, and a frequency domain multiplexed (FDM) multi-UL transmission mode.

16. The RAN node of claim 15, wherein the second joint SRI being the same as the joint SRI in response to the selected UL transmission mode being the SDM multi-UL transmission mode or the FDM multi-UL transmission mode.

17. A method of operating a user equipment (UE) device, the method comprising:

determining simultaneous uplink (UL) transmission configuration information, the simultaneous UL transmission information including at least a first sounding reference signal (SRS) resource set and a second SRS resource set;

transmitting SRS according to the simultaneous UL transmission configuration information;

receiving a joint SRS indicator (SRI) from a serving RAN node; and performing at least one UL transmission based on the joint SRI and the simultaneous UL transmission configuration information; and receiving a second joint SRI that corresponds to a NULL entry in either the first SRS resource set or the second SRS resource set for single-shot UL transmission and to valid entries in the first SRS resource set and the second SRS resource set for multi-UL transmission, the second joint SRI being different than the joint SRI in response to a selected UL transmission mode being a spatial-domain multiplexed (SDM) multi-UL transmission mode.

18. The method of claim 17, wherein the joint SRI corresponds to an entry in the first SRS resource set and the second SRS resource set; and the method further comprises, determining UL resources in each of the first and second SRS resource sets corresponding to the joint SRI, and performing the at least one UL transmission to at least one of the serving RAN node and a second RAN node based on the determined UL resources.

19. The method of claim 18, wherein the first SRS resource set includes at least one first single-UL transmission resource corresponding to at least one first UL transmission configuration indicator (TCI) state to the serving RAN node, at least one first NULL resource, and at least one first multi-UL transmission resource corresponding to the at least one first UL TCI state; and the second SRS resource set includes at least one second NULL resource corresponding to the at least one first single-UL transmission resource, at least one second single-UL transmission resource corresponding to at least one second UL TCI state to the second RAN node, the at least one second single-UL transmission resource corresponding to the at least one first NULL resource, and at least one second multi-UL transmission resource corresponding to the at least one second UL TCI state, the at least one second multi-UL transmission resource corresponding to the at least one first multi-UL transmission resource.

20. The method of claim 19, further comprising:

determining a UL transmission mode based on the joint SRI, the first SRS resource set, and the second SRS resource set; and performing the at least one UL transmission based on the determined UL transmission mode.

* * * * *